(12) United States Patent
Sakuragi et al.

(10) Patent No.: US 11,938,814 B2
(45) Date of Patent: Mar. 26, 2024

(54) DRIVING ASSISTANCE DEVICE

(71) Applicant: Mazda Motor Corporation, Hiroshima (JP)

(72) Inventors: Yutaka Sakuragi, Hiroshima (JP);
Tomoya Yamamoto, Hiroshima (JP);
Kenichi Nakamoto, Hiroshima (JP);
Yasuyuki Tonohara, Hiroshima (JP);
Yu Morokuma, Hiroshima (JP);
Katsuhisa Maedo, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 122 days.

(21) Appl. No.: 17/555,545

(22) Filed: Dec. 20, 2021

(65) Prior Publication Data

US 2022/0219531 A1    Jul. 14, 2022

(30) Foreign Application Priority Data

Jan. 13, 2021   (JP) .................................. 2021-003544

(51) Int. Cl.
*B60K 26/02* (2006.01)
*B62D 1/04* (2006.01)
(Continued)

(52) U.S. Cl.
CPC ............ *B60K 26/02* (2013.01); *B60K 26/021* (2013.01); *B62D 1/046* (2013.01); *G05G 1/025* (2013.01);
(Continued)

(58) Field of Classification Search
CPC ...... B60K 26/02; B60K 26/021; B60K 26/04; B60K 2026/028; B60K 2026/046;
(Continued)

(56) References Cited

U.S. PATENT DOCUMENTS 5,947,227 A      9/1999   Kempf
11,643,056 B2 *  5/2023   Sakuragi ................. B60T 7/085
                                                       180/332
(Continued)

FOREIGN PATENT DOCUMENTS

EP    0829388 A2 *  3/1998
FR    2911700 A1 *  7/2008
(Continued)

OTHER PUBLICATIONS

Machine Translation of JP-2021113020-A.*
(Continued)

*Primary Examiner* — Adam D Rogers
(74) *Attorney, Agent, or Firm* — XSENSUS LLP

(57) ABSTRACT

A driving assistance device enables a driver who manually performs an accelerator operation and a steering operation to easily retain an accelerator operation state in a constant state. A driving assistance device includes a manually operable accelerator operation unit in the vicinity of a steering wheel provided in front of a driver seat in a vehicle cabin. The accelerator operation unit is operable in a state where the steering wheel is gripped and an operation reaction force of the accelerator operation unit exhibits an inflection point POI at which the operation reaction force rapidly becomes large in response to an increase in an operation amount of the accelerator operation unit.

5 Claims, 7 Drawing Sheets

(51) Int. Cl.
*G05G 1/02* (2006.01)
*G05G 5/03* (2008.04)
(52) U.S. Cl.
CPC .......... *G05G 5/03* (2013.01); *B60K 2026/028* (2013.01)
(58) Field of Classification Search
CPC ........ B60K 2026/023; B60K 2026/022; B62D 1/04; B62D 1/043; B62D 1/046; B62D 1/06; B62D 1/065; B62D 1/08; B62D 1/10; G05G 5/03; G05G 5/05; G05G 1/025

See application file for complete search history.

(56) References Cited

U.S. PATENT DOCUMENTS

| | | | | |
|---|---|---|---|---|
| 2004/0143379 | A1* | 7/2004 | Borroni-Bird | B60T 7/085 701/36 |
| 2015/0298546 | A1* | 10/2015 | Maruyama | B60W 20/20 903/902 |
| 2016/0200194 | A1* | 7/2016 | Maruyama | B60K 26/021 74/512 |
| 2021/0165431 | A1* | 6/2021 | Backes | G05D 16/166 |
| 2022/0234644 | A1* | 7/2022 | Yamamoto | A61F 4/00 |
| 2022/0348172 | A1* | 11/2022 | Yanagida | B60T 7/042 |

FOREIGN PATENT DOCUMENTS

| | | | |
|---|---|---|---|
| FR | 2917342 A1 | * | 12/2008 |
| JP | 9-277850 A | | 10/1997 |
| JP | 2021113020 A | * | 8/2021 |
| WO | WO-2010046941 A1 | * | 4/2010 |
| WO | WO-2010109510 A1 | * | 9/2010 |
| WO | 2020/256025 A1 | | 12/2020 |

OTHER PUBLICATIONS

Machine Translation of FR-2917342-A1.*
Machine Translation of FR-2911700-A1.*
Extended European search report dated Jun. 10, 2022, in corresponding European patent Application No. 21215819.0, 8 pages.

* cited by examiner

DRIVING ASSISTANCE DEVICE

CROSS-REFERENCE TO RELATED APPLICATION

This application claims priority to Japanese Application No. 2021-003544, filed Jan. 13, 2021, the entire contents of which are incorporated herein by reference.

The present invention relates to a driving assistance device including a manually operable accelerator operation unit in the vicinity of a steering wheel provided in front of a driver seat in a vehicle cabin.

BACKGROUND

A driving assistance device has been proposed in which as disclosed in Japanese Patent Laid-Open No. 9-277850 ("Patent Literature 1"), an operation unit for performing an accelerator operation of a vehicle is provided in the vicinity of a steering grip portion so that even a physically handicapped person, who is handicapped in a lower limb and has difficulty in a stepping operation of a brake pedal and an accelerator pedal by his/her foot (lower-limb disabled person), is enabled to perform an accelerator operation of a vehicle by a manual operation while performing steering of a steering grip portion in a state where he/she is seated on a driver seat.

That is, the driving assistance device disclosed in Patent Literature 1 includes an accelerator operation unit enabling a manual accelerator operation in a steering wheel and adjusts an operation reaction force of the accelerator operation unit in accordance with a vehicle speed and a steering angle.

There has been a concern that fatigue of a hand of a driver which accompanies an accelerator operation can be reduced by adjusting the operation reaction force of the accelerator operation unit as in the above related art but the driver has difficulty in retaining an accelerator operation amount in a constant state due to a continuous change in the operation reaction force.

Further, there has been a problem that since a driver who manually performs an accelerator operation has to simultaneously perform an operation of a steering wheel and an accelerator operation, the driver has to quickly and largely steer the steering wheel, for example, in a situation where a right or left turn is made at a street corner, an intersection, or the like, which causes a change in an operation force on an accelerator operation unit which is operated by a fingertip in a steering operation and thus results in slight acceleration or deceleration of a vehicle, so that riding comfort is degraded.

SUMMARY

Accordingly, an object of embodiments of the present disclosure is to provide a driving assistance device that enables a driver who manually performs an accelerator operation and a steering operation to easily retain an accelerator operation state in a constant state.

A driving assistance device according to embodiments of the present disclosure is a driving assistance device including a manually operable accelerator operation unit in a vicinity of a steering wheel provided in front of a driver seat in a vehicle cabin, in which the accelerator operation unit is operable in a state where the steering wheel is gripped and an operation reaction force of the accelerator operation unit exhibits an inflection point at which the operation reaction force rapidly becomes large in response to an increase in an operation amount of the accelerator operation unit.

With the above configuration, because the inflection point is present, even when the operation force (the force of a finger of a driver) on the accelerator operation unit slightly increases, the operation amount does not change very much as long as the operation amount of the accelerator operation unit does not exceed the inflection point. Thus, retainment of an accelerator operation can easily be performed.

In one aspect of embodiments of the present disclosure, at the inflection point of the operation reaction force, target requested acceleration of a vehicle by an accelerator operation is set to approximately zero.

The above-described case where the target requested acceleration is approximately zero means a range of ±0.05 G with respect to zero G. Further, G denotes gravitational acceleration (gravity).

With the above configuration, because at the inflection point of the operation reaction force, the target requested acceleration of the vehicle by the accelerator operation is set to approximately zero (in other words, approximately zero G), acceleration and deceleration do not occur in a state where the accelerator operation is retained. Thus, a steering operation can safely be performed.

In one aspect of embodiments of the present disclosure, the accelerator operation unit includes a first operation reaction force generation unit which generates an operation reaction force in a region where the operation amount is smaller than an operation amount at the inflection point of the operation reaction force and a second operation reaction force generation unit which generates an operation reaction force in a region where the operation amount is larger than the operation amount at the inflection point of the operation reaction force.

With the above configuration, the first operation reaction force generation unit and the second operation reaction force generation unit are provided, and different operation reaction forces can thereby be set for the region where the operation amount is smaller than the operation amount at the inflection point (first operation region) and for the region where the operation amount is larger than the operation amount (second operation region).

In one aspect of embodiments of the present disclosure, the accelerator operation unit is provided in an arc shape along an inner periphery side of the steering wheel, at least four or more support portions which are capable of a slide operation with respect to the steering wheel are arranged in left-right symmetry, and at least one support portion among the support portions is configured to serve as the second operation reaction force generation unit.

With the above configuration, at least four or more support portions capable of a slide operation with respect to the steering wheel are arranged in left-right symmetry, and an operational feeling of the accelerator operation unit with respect to the steering wheel can be made uniform.

Embodiments of the present disclosure provide an advantageous effect that a driver who manually performs an accelerator operation and a steering operation can easily retain an accelerator operation state in a constant state.

DETAILED DESCRIPTION

In some embodiments, a driving assistance device enables a driver to manually perform an accelerator operation and a steering operation at the same time. The driving assistance device may include a manually operable accelerator operation unit in a vicinity of a steering wheel provided in front of a driver seat in a vehicle cabin. The accelerator operation unit is operable in a state where the steering wheel is gripped. An operation reaction force opposes a force applied by the driver's hand to the accelerator operation unit, which moves downward when pressed. The operation reaction force of the accelerator operation unit may exhibit an inflection point at which the operation reaction force rapidly becomes large in response to an increase in an operation amount of the accelerator operation unit. In some embodiments, this makes it easier for the driver to maintain a state of constant (e.g., zero) acceleration.

An embodiment of the present disclosure will hereinafter be described in detail with reference to drawings.

Figure 1:
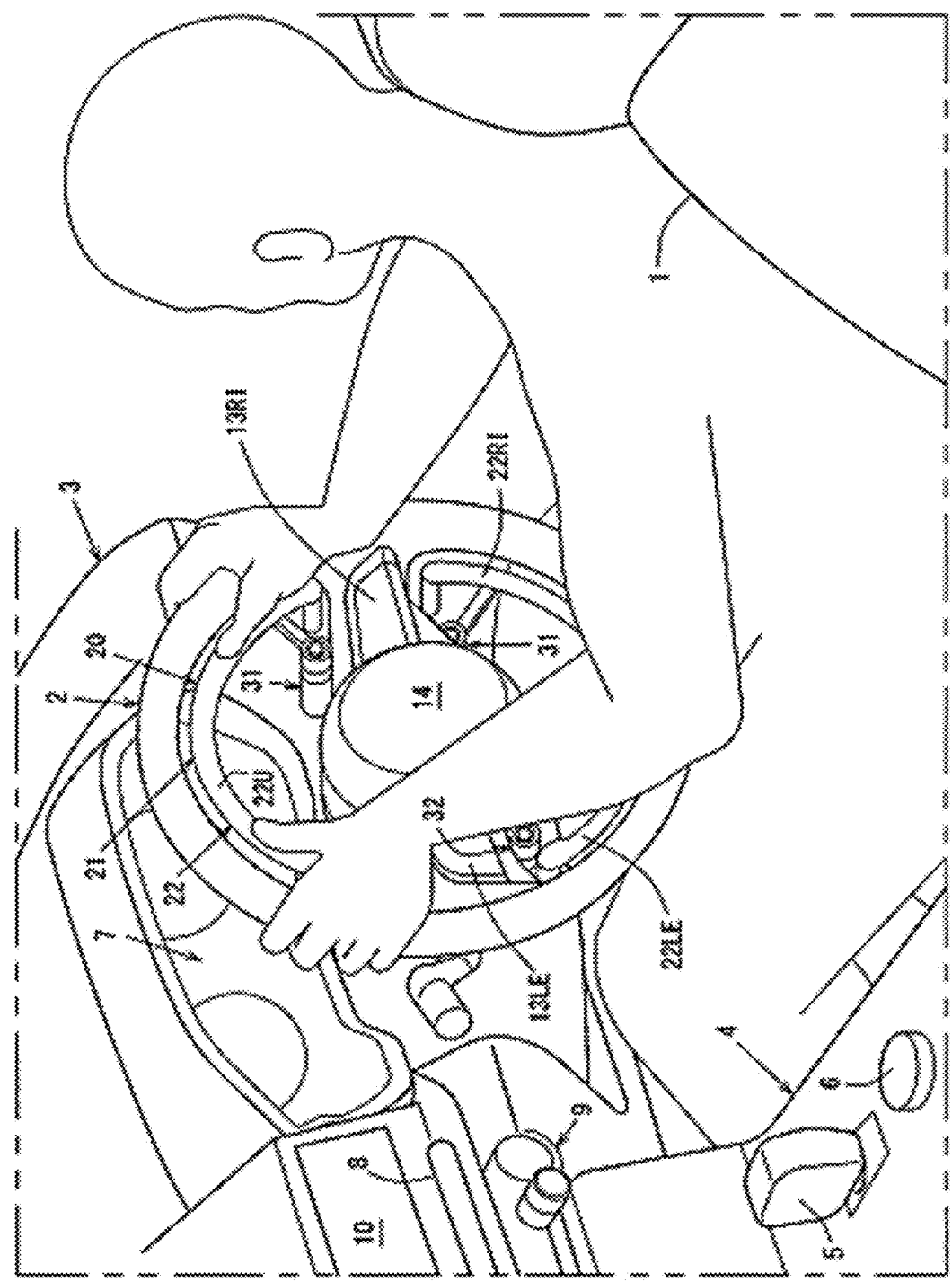
FIG. 1 is a perspective view of an internal portion of a vehicle including a driving assistance device of the present disclosure.
Figure 2:
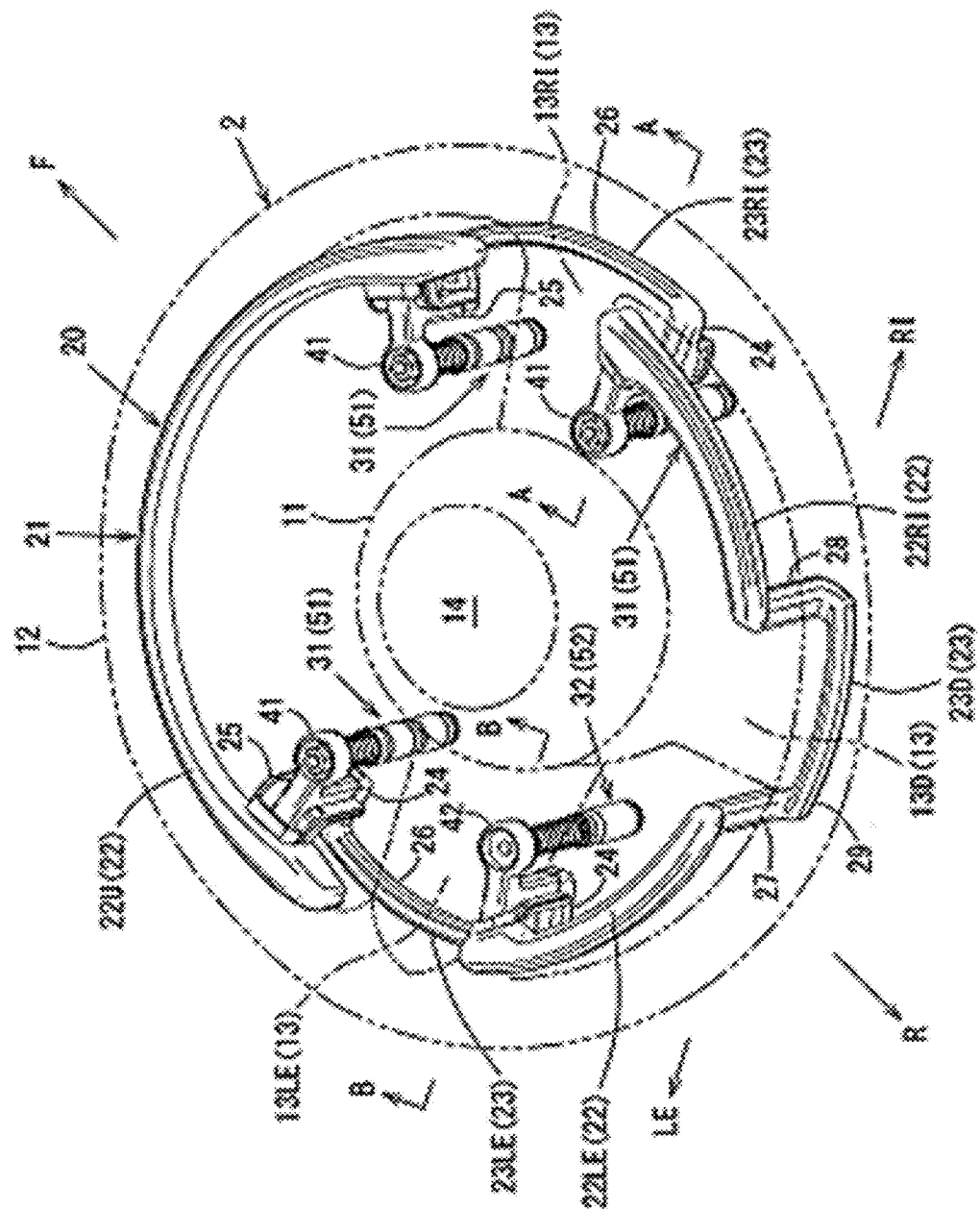
FIG. 2 is a perspective view illustrating an accelerator operation unit provided to a steering wheel.
Figure 3:
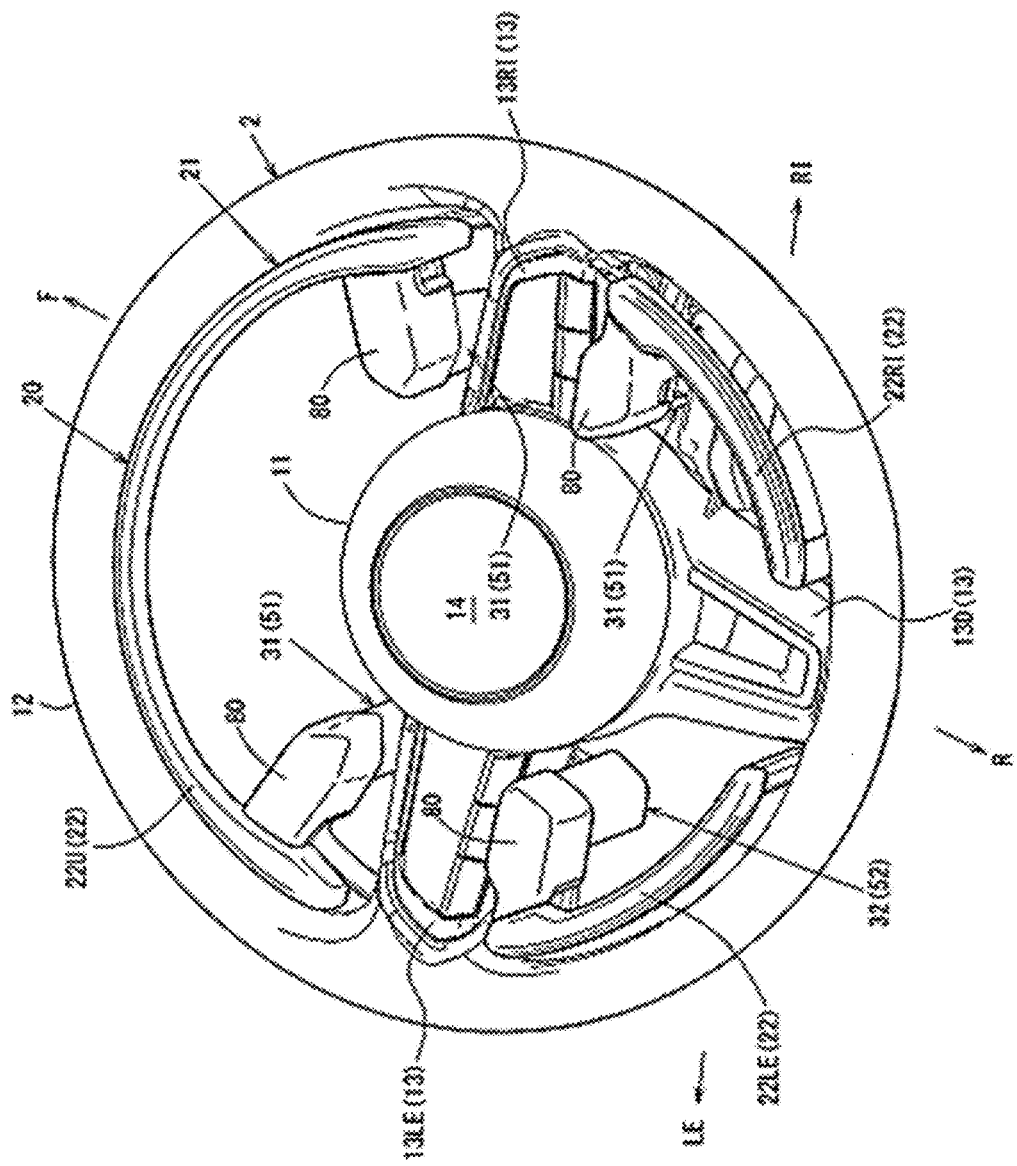
FIG. 3 is a perspective view of the steering wheel in a front view.
Figure 4:
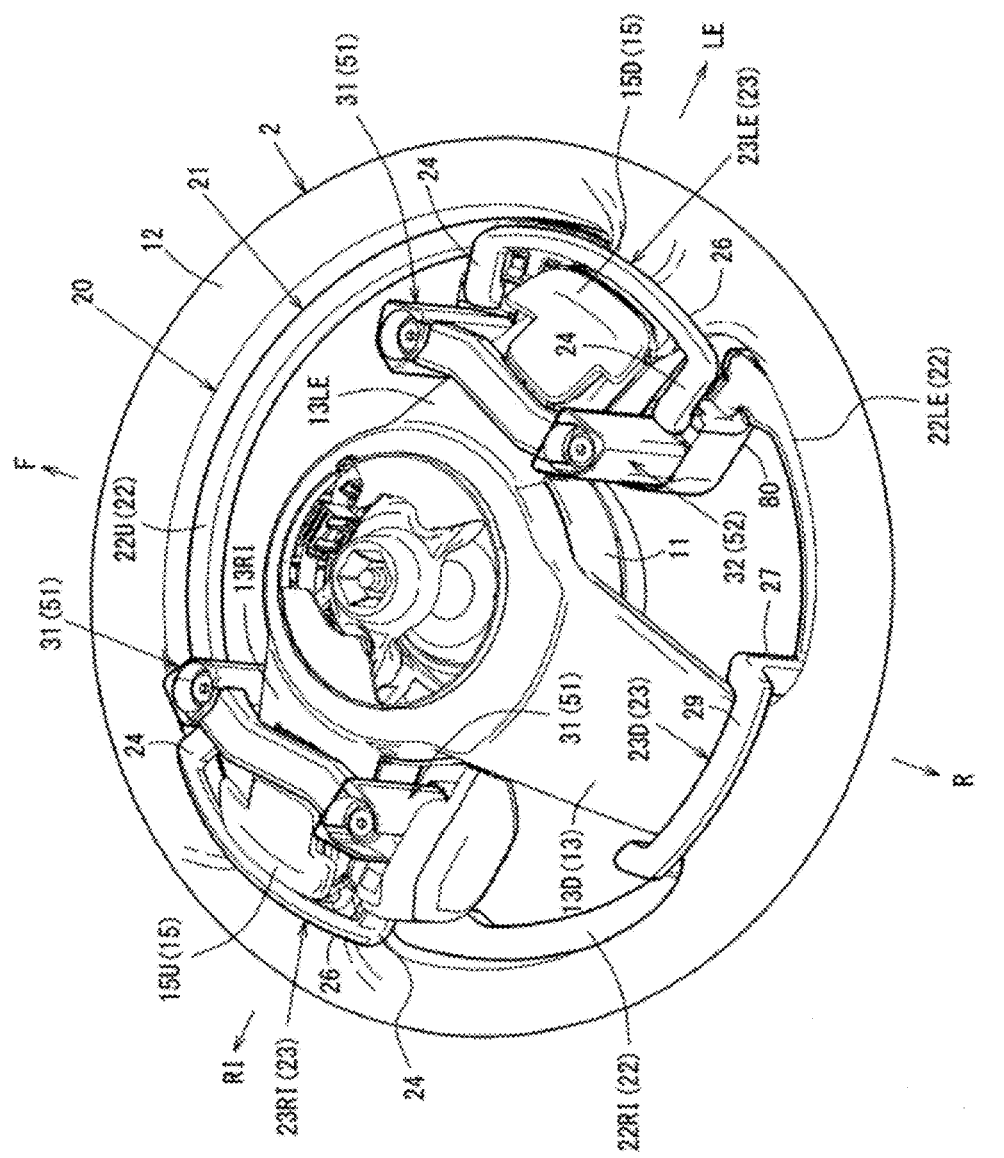
FIG. 4 is a perspective view of the steering wheel in a back view.

FIG. 1 is a perspective view of an internal portion of a vehicle including a driving assistance device, FIG. 2 is a perspective view illustrating an accelerator operation unit provided to a steering wheel, FIG. 3 is a perspective view of the steering wheel in a front view, and FIG. 4 is a perspective view of the steering wheel in a back view.

Figure 5:
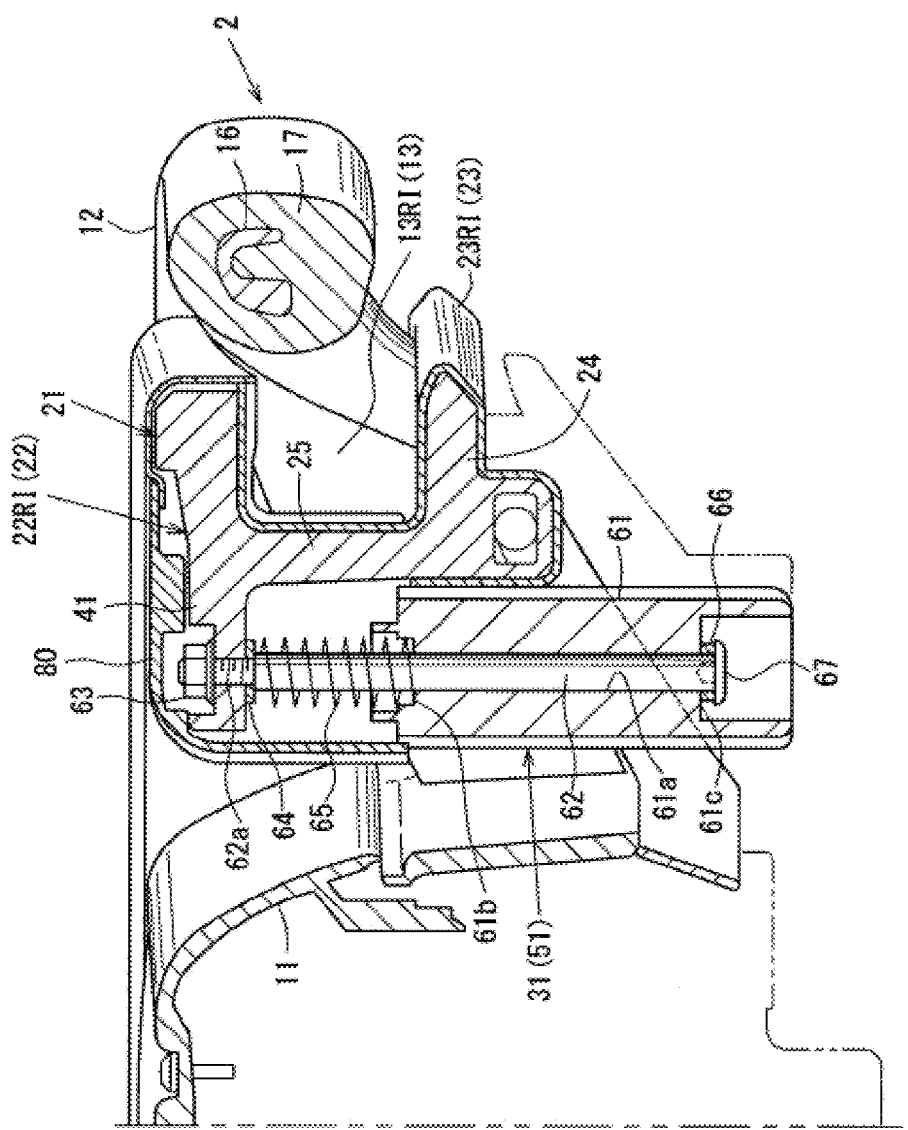
FIG. 5 is an arrow cross-sectional view taken along line A-A in FIG. 2.
Figure 6:
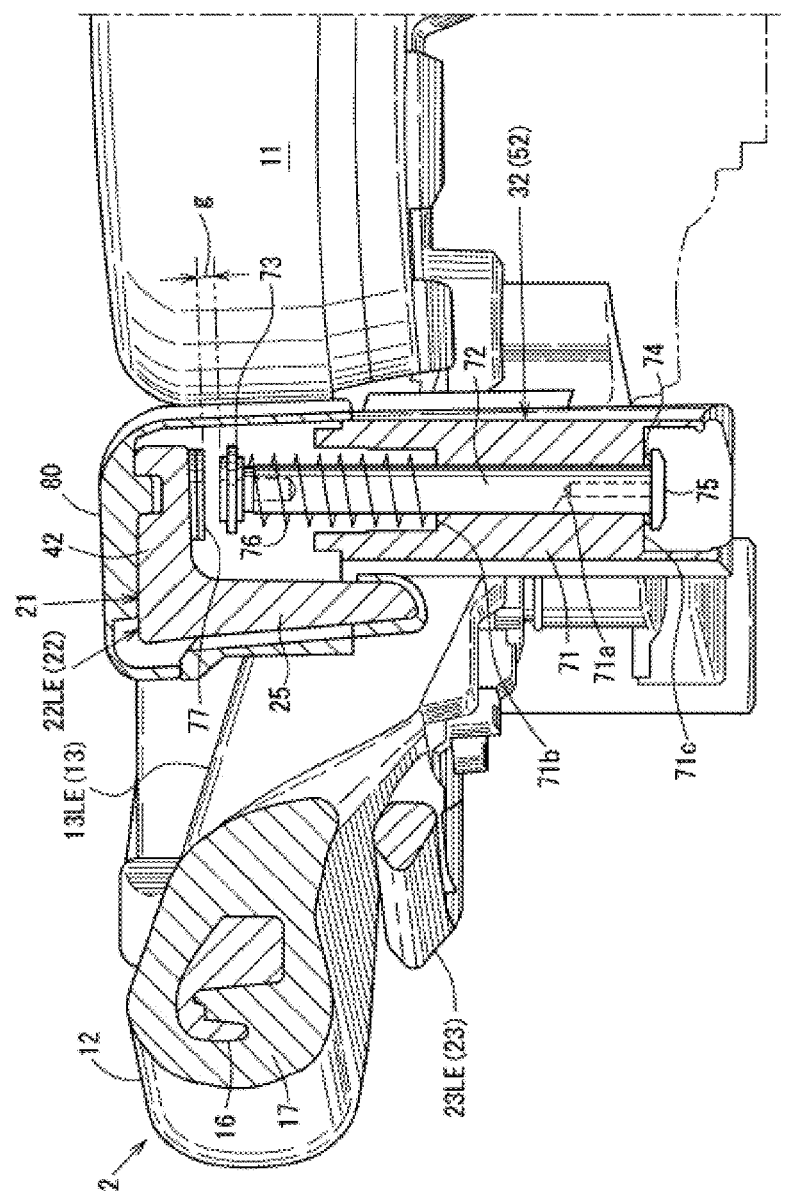
FIG. 6 is an arrow cross-sectional view taken along line B-B in FIG. 2.
Figure 7:
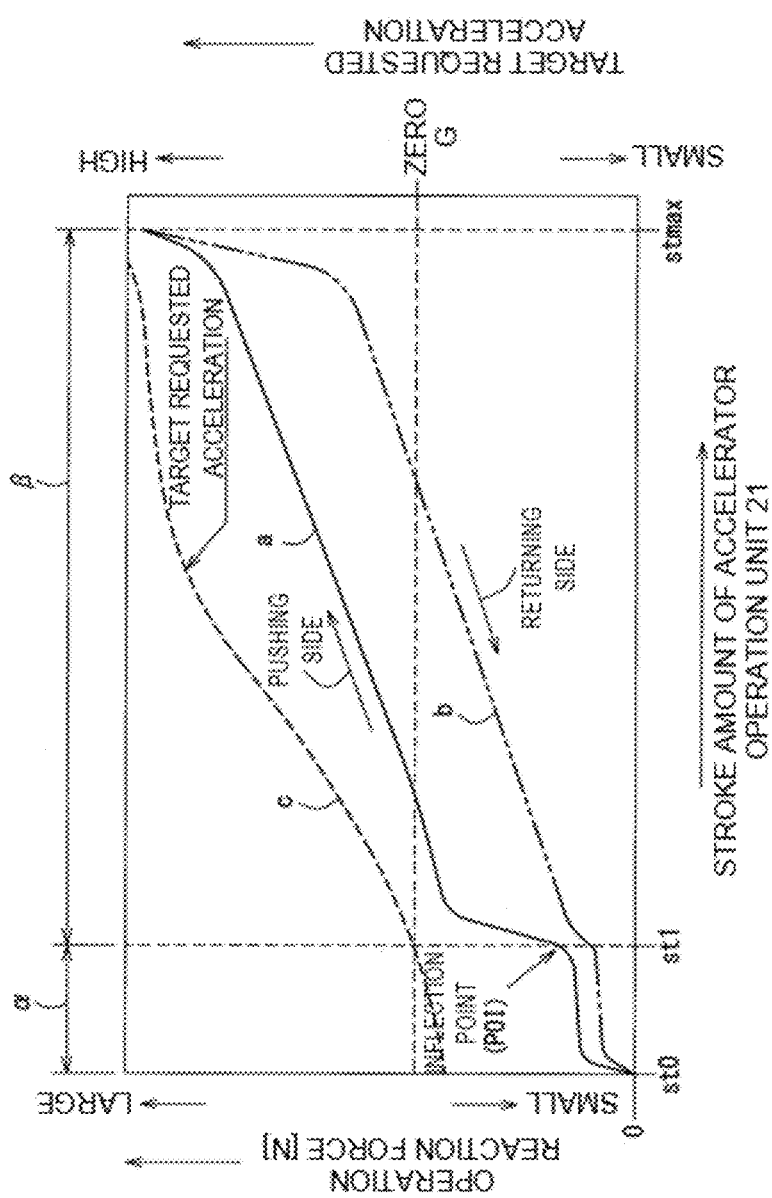
FIG. 7 is a characteristic diagram illustrating a change in a reaction force with respect to a stroke amount of the accelerator operation unit.

Further, FIG. 5 is an arrow cross-sectional view taken along line A-A in FIG. 2, FIG. 6 is an arrow cross-sectional view taken along line B-B in FIG. 2, and FIG. 7 is a characteristic diagram illustrating a change in a reaction force with respect to a stroke amount of the accelerator operation unit.

Note that in the drawings, an arrow F indicates a vehicle front region, an arrow R indicates a vehicle rear region, an arrow LE indicates a vehicle left region, and an arrow RI indicates a vehicle right region.

Referring to FIG. 1, a driver seat 1 and a passenger seat (not illustrated) are mounted on left and right sides of a front portion of a floor in a vehicle cabin in a vehicle, and in front of the driver seat 1, a steering wheel 2 is provided which is operated in a state where that is gripped by a driver seated on the driver seat 1.

At a front end of the vehicle cabin, an instrument panel 3 is provided throughout the vehicle cabin in a vehicle width direction. A center console 4 is attached between the driver seat 1 and the passenger seat in a floor front portion of the vehicle cabin, and a front portion of the center console 4 may be integrally connected with a vehicle-width-direction center portion of the instrument panel 3. The center console 4 forms a portion of an interior member of the vehicle cabin, and in a part of the center console 4, the part being operable by the left hand of the driver seated on the driver seat 1, a shift knob 5, a start switch 6, and so forth may be disposed.

On a front side of the driver seat 1 in the instrument panel 3, a display unit 7 of various kinds of meter instruments such as a tachometer and a speedometer is disposed so as to be visually recognized across the steering wheel 2. Above a connection portion to the front portion of the center console 4 on a left side of the display unit 7, a wind outlet 8 of air-conditioning air and various kinds of operation buttons 9 such as setting dials of an audio device and an air-conditioning device are disposed. In addition, above those, a display 10 of a navigation device 10 may be provided.

Note that in a position, on which the right foot of the driver seated on the driver seat 1 is placed, on a floor in front of the driver seat 1 in the vehicle cabin, an accelerator pedal (not illustrated) may be provided. On a left side of the accelerator pedal in the vehicle width direction (on a center side in the vehicle width direction), a brake pedal (not illustrated) may be provided.

Both of the accelerator pedal and the brake pedal are common pedals which may be included in a base vehicle.

Further, as illustrated in FIG. 2 and FIG. 3, the above-described steering wheel 2 may include a base portion 11 which is coupled with a steering shaft (not illustrated), a rim portion 12 which is gripped by the driver and is arranged in a ring shape around the base portion 11 as a center on an outer periphery side of the base portion 11 when seen from the driver side (hereinafter, abbreviated as driver-side view) in an axis direction of the steering shaft (hereinafter, abbreviated as steering axis direction), and plural spoke portions 13 which radially extend from the base portion 11 to the rim portion 12.

In this embodiment, the spoke portions 13 have three spoke portions which are a right-side spoke portion 13RI extending rightward from the base portion 11 in the driver-side view in the steering axis direction (that is, a front view), a left-side spoke portion 13LE extending leftward, and a lower-side spoke portion 13D extending downward.

As illustrated in FIG. 2 and FIG. 3, a horn unit 14 which is pressed to sound a horn (warning sound) may be provided on a driver side of the base portion 11 in the steering axis direction.

On the driver side of the left and right spoke portions 13LE and 13RI in the steering axis direction, plural operation switches (not illustrated) for operating in-vehicle equipment such as the audio device and the navigation device may be disposed.

Further, as illustrated in FIG. 4, the steering wheel 2 may include paddle shift devices 15 which correspond to up-shifting and down-shifting.

In this embodiment, a paddle shift device 15U for up-shifting is provided to the right-side spoke portion 13RI, and a paddle shift device 15D for down-shifting is provided to the left-side spoke portion 13LE.

As illustrated in FIG. 5 and FIG. 6, the steering wheel 2 has a core bar 16 as a frame member, and the core bar 16 may be covered by an outer cover member 17 of urethane or the like.

Next, a description will be made about a driving assistance device 20 (acceleration-deceleration manual operation assistance device) of the present embodiment, which is incorporated in a base vehicle.

As illustrated in FIG. 1 to FIG. 6, the driving assistance device 20 may include an accelerator operation unit 21 whose slide displacement is performed along the steering axis direction and which thereby performs acceleration and deceleration operations of the vehicle, first support portions 31 and a second support portion 32 which slidably support the accelerator operation unit 21 along the steering axis direction, and transmission means which detects a slide displacement amount (stroke amount) of the accelerator operation unit 21 and transmits the detected slide displacement amount (stroke amount), as a signal, to an ECU controlling an opening of a throttle valve of an engine.

The accelerator operation unit 21 may be disposed in the vicinity of the steering wheel 2 and integrally formed with plural operation units 22, which are operated in a manner such that the driver pushes the plural operation units 22 downward (or the like) in the steering axis direction with the thumb or other portion of his/her hand gripping the steering wheel 2. Opposed portions 41 and 42 are slide supported portions which are supported by first and second support portions 31 and 32 slidably in the steering axis direction. Connecting portions 23 couple the plural operation units 22 together and couple the operation units 22 and the opposed portions 41 and 42 together. As a result of connecting portions 23, plural operation units 22 slide together along opposed portions 41 and 42 when any one of plural operation units 22 is pressed downwards by the driver.

For example, in some embodiments, plural operation units 22 may be curved levers that can be pressed downward by the diver's hand while simultaneously gripping the steering wheel. The levers could have other shapes and be arranged differently, provided that the driver can press them with his/her hand while also gripping the steering wheel. In this way, the driver may safely control acceleration of the vehicle through manual operation.

As illustrated in FIG. 2, the operation unit 22 may be disposed in an arc shape in an inside vicinity with respect to the rim portion 12 of the steering wheel 2 in the driver-side view in the steering axis direction, in other words, an arc shape along an inner periphery side of the steering wheel 2. An upper surface of the operation unit 22 in the steering axis direction may be formed into a flat shape such that the driver easily presses the upper surface of the operation unit 22 with the pad of the thumb of his/her hand gripping the steering wheel 2.

In addition, as illustrated in FIG. 2 and FIG. 3, the operation units 22 may be divided into sections corresponding to the spoke portions 13 in the driver-side view in the steering axis direction and respectively formed into arc shapes along the rim portion 12.

Specifically, in some embodiments, the operation units 22 may include three operation units as follows: an upper-side operation unit 22U arranged above both of the left and right spoke portions 13LE and 13RI in the driver-side view in the steering axis direction; a lower-right operation unit 22RI arranged between the right-side spoke portion 13RI and the lower-side spoke portion 13D; and a lower-left operation unit 22LE arranged between the left-side spoke portion 13LE and the lower-side spoke portion 13D.

As illustrated in FIG. 2, as for the above-described opposed portions 41 and 42, the opposed portions 41 and 42 are disposed on both of upper and lower sides of the right-side spoke portion 13RI in the driver-side view in the steering axis direction. The opposed portion 41 is disposed on an upper side of the left-side spoke portion 13LE, and the opposed portion 42 is disposed on a lower side of the left-side spoke portion 13LE.

As illustrated in the embodiment of FIG. 2, the connecting portions 23 may include a right-side connecting portion 23RI which couples the upper-side operation unit 22U and the lower-right operation unit 22RI together, a left-side connecting portion 23LE which couples the upper-side operation unit 22U and the lower-left operation unit 22LE together, and a lower-side connecting portion 23D which couples the right-side operation unit 22RI and the lower-left operation unit 22LE together. The right-side connecting portion 23RI is disposed in the section corresponding to the right-side spoke portion 13RI, the left-side connecting portion 23LE is disposed in the section corresponding to the left-side spoke portion 13LE, and the lower-side connecting portion 23D is disposed in the section corresponding to the lower-side spoke portion 13D.

Next, because the right-side connecting portion 23RI and the left-side connecting portion 23LE are in a left-right symmetrical shape in some embodiments, structures of those connecting portions 23 will be described based on a configuration of the right-side connecting portion 23RI.

As illustrated in the embodiment of FIG. 2, the right-side connecting portion 23RI may be integrally formed with radial-direction coupling sides 24 on both of upper and lower sides, which extend in the radial directions of the steering wheel 2 (rim portion 12) in both of upper and lower side vicinities of the right-side spoke portion 13RI. Axis-direction coupling sides 25 may extend upward in the steering axis direction from those radial-direction coupling sides 24 on both of the upper and lower sides, and a circumferential-direction coupling side 26 may couple the radial-direction coupling sides 24 on both of the upper and lower sides together in the circumferential direction of the steering wheel 2.

The opposed portion 41 may be coupled with a radial-direction inner end portion in an upper portion of the above-described axis-direction coupling side 25, and a radial-direction outer end portion may be coupled with a lower right side of the upper-side operation unit 22U. Note that because the left-side connecting portion 23 LE and the above-described right-side connecting portion 23RI are in a symmetrical structure in this embodiment, the same reference characters as those on the right side are given to the left-side connecting portion 23LE.

Next, a description will be made based on a configuration of the lower-side connecting portion 23D in some embodiments.

As illustrated in FIG. 2, the lower-side connecting portion 23D may be integrally formed with a left-side axis-direction coupling side 27 which extends generally downward in the steering axis direction from an extending-direction end portion of the lower-left operation unit 22LE in a left-side vicinity of the lower-side spoke portion 13D, a right-side axis-direction coupling side 28 which extends generally downward in the steering axis direction from an extending-direction end portion of the lower-right operation unit 22RI in a right-side vicinity of the lower-side spoke portion 13D, and a circumferential-direction coupling side 29 which couples both of those left-side and right-side axis-direction coupling sides 27 and 28 together in the circumferential direction of the steering wheel 2.

As illustrated in the embodiment of FIG. 2, at least four or more support portions may enable a slide operation of the above-described accelerator operation unit 21 with respect to the steering wheel 2. In this embodiment, four support portions 31 and 32 are arranged in left-right symmetry.

As illustrated in the embodiment of FIG. 2, the first support portions 31 and 31 are arranged on both of upper and lower sides of the right-side spoke portion 13RI in the driver-side view in the steering axis direction. The first support portion 31 is arranged on an upper side of the left-side spoke portion 13LE, the second support portion 32 is arranged on a lower side in addition, and a total of four support portions 31 and 32 are configured to be in left-right symmetry.

More specifically, as illustrated in the embodiment of FIG. 2, the first support portions 31 may be respectively arranged in an upper left position, an upper right position, and a lower right position across the left and right spoke portions 13LE and 13RI, and the second support portion 32 may be arranged in a lower left position across the left and right spoke portions 13LE and 13RI.

FIG. 7 is a characteristic diagram in which the horizontal axis represents a stroke amount as an operation amount of the accelerator operation unit 21, the left-side vertical axis represents an operation reaction force, and the right-side vertical axis represents target requested acceleration.

In FIG. 7, a characteristic (a) indicates the characteristic of a pushing-down side of the accelerator operation unit 21, a characteristic (b) indicates the characteristic of a returning side (in other words, a direction in which a pushing-down force is weakened) of the accelerator operation unit 21, and a characteristic (c) indicates the characteristic of the target requested acceleration with respect to the stroke amount of the accelerator operation unit 21.

As illustrated in the embodiment of FIG. 7, the operation reaction force of the accelerator operation unit 21 may exhibit an inflection point POI (abbreviation for "point of inflection") at which the operation reaction force rapidly becomes large in response to an increase in the stroke amount as the operation amount of the accelerator operation unit 21.

That is, as indicated by the characteristic (a) in FIG. 7, in a range of a zero stroke amount st0 at which the stroke amount of the accelerator operation unit 21 is zero to a predetermined stroke amount st1 at which the stroke amount increases by a predetermined amount, the operation reaction force is generally constant. The operation reaction force rapidly becomes large when the stroke amount exceeds the inflection point POI, and the operation reaction force thereafter becomes large in accordance with an increase in the stroke amount in a range to a maximum stroke amount stmax.

Accordingly, in the range of the zero stroke amount st0 to the predetermined stroke amount st1, even when the operation force on the accelerator operation unit 21 slightly increases, the operation amount does not change very much as long as the operation amount of the accelerator operation unit 21 (in other words, a pushing-down stroke amount) does not exceed the inflection point POI. Thus, the accelerator operation is easily performed through manual operation in this embodiment.

Further, as illustrated in the embodiment of FIG. 7, at the inflection point POI of the operation reaction force, the target requested acceleration (see the characteristic c) of the vehicle by the accelerator operation may be set to approximately zero. Approximately zero denotes a range of ±0.05 G with respect to zero G (G denotes an abbreviation for gravitational acceleration "gravity"). In this embodiment, as illustrated in FIG. 7, at the inflection point POI of the operation reaction force, the target requested acceleration of the vehicle by the accelerator operation is set to zero G.

Specifically, in this embodiment, a setting is made such that when the stroke amount of the accelerator operation unit 21 is the predetermined stroke amount st1, the inflection point POI of the operation reaction force is reached, and at this inflection point POI of the operation reaction force, the target requested acceleration of the vehicle by the accelerator operation becomes zero G. Accordingly, because acceleration and deceleration does not occur in a state where the accelerator operation by the accelerator operation unit 21 is retained at the predetermined stroke amount st1, a steering operation may be safely performed by the driver.

As illustrated in FIG. 2 and FIG. 7, the accelerator operation unit 21 may include a first operation reaction force generation unit 51, which generates an operation reaction force in a region where the operation amount is smaller than the operation amount (predetermined stroke amount st1) at the inflection point POI of the operation reaction force in FIG. 7. The accelerator operation unit 21 also may include a second operation reaction force generation unit 52, which generates an operation reaction force in a region where the operation amount is larger than the operation amount (predetermined stroke amount st1) at the inflection point POI of the operation reaction force.

The above-described first operation reaction force generation units 51 may be coupled with the first support portions 31, and the above-described second operation reaction force generation unit 52 may be coupled with the second support portion 32.

As described above, in some embodiments, the first operation reaction force generation units 51 and the second operation reaction force generation unit 52 are provided, and different operation reaction forces may be set for the region where the operation amount is smaller than the operation amount (predetermined stroke amount st1) at the inflection point POI in FIG. 7 (a first operation region α) and for the region where the operation amount is larger than the operation amount (predetermined stroke amount st1) (a second operation region β).

As illustrated in the embodiment of FIG. 2, a total of four support portions 31 and 32 may be arranged in left-right symmetry, one support portion positioned in a lower-left part among those support portions 31 and 32. Thus, the second support portion 32 may serve as the second operation reaction force generation unit 52, and the three first support portions 31 may serve as the first operation reaction force generation units 51.

As described above, in some embodiments, a configuration is made such that the four support portions 31 and 32 capable of a slide operation with respect to the steering wheel 2 are arranged in left-right symmetry and an operational feeling of the accelerator operation unit 21 with respect to the steering wheel 2 is thereby made uniform.

Next, a description will be made about a specific structure of the first operation reaction force generation unit 51 configuring the first support portion 31 with reference to the embodiment of FIG. 5. Because each of a total of three first operation reaction force generation units 51 is configured the same, here, a description will be made about the first operation reaction force generation unit 51 positioned in a lower right part in FIG. 2.

As illustrated in the embodiment FIG. 5, the first operation reaction force generation unit 51 may include a support tube 61 which is attached to a rigid member on the steering wheel 2 side, the rigid member integrally rotating with the base portion 11, a rod 62 which is arranged to pass through a through hole 61a of the support tube 61 and to be capable of up-down movement with respect to the through hole 61a, and an upper-side nut 63 and a lower-side spring retainer 64 which fix a screw portion 62a at an upper end of the rod 62 to the opposed portion 41.

Further, between a recessed bottom portion in an upper end recess 61b of the above-described support tube 61 and the spring retainer 64, a first coil spring 65 may be stretched as urging means which urges the lower-right operation unit 22RI of the operation unit 22 upward.

In addition, in a lower end recess 61c of the above-described support tube 61, a fall prevention member 67 may be provided to a lower end of the rod 62 via a spacer 66. This fall prevention member 67 is configured with a bolt, and the fall prevention member 67 is screwed in the lower end of the rod 62.

A spring force of the above-described first coil spring 65 may be set small compared to a spring force of a second coil spring 76 described later.

When the lower-right operation unit 22RI illustrated in FIG. 5 is pushed down against the spring force of the first coil spring 65, the characteristic of the first operation region α illustrated in FIG. 7 can be obtained.

Because the upper-left and upper-right first operation reaction force generation units 51 illustrated in FIG. 2 are configured the same as the first operation reaction force generation unit 51 illustrated in FIG. 5, the characteristic of the first operation region α illustrated in FIG. 7 can be obtained also by pushing down the upper-side operation unit 22U against the spring force of the first coil spring 65.

Next, a description will be made about a specific structure of the second operation reaction force generation unit 52 configuring the second support portion 32 with reference to the embodiment of FIG. 6.

As illustrated in the embodiment of FIG. 6, the second operation reaction force generation unit 52 may include a support tube 71 which is attached to a rigid member on the steering wheel 2 side, the rigid member integrally rotating with the base portion 11, and a rod 72 which is arranged to pass through a through hole 71a of the support tube 71 and to be capable of up-down movement with respect to the through hole 71a.

An upper end recess 71b may be formed at an upper end of the above-described support tube 71, and a lower end recess 71c may be formed at a lower end of the support tube 71.

Further, while a spring retainer 73 may be fixed by screwing to an upper end of the above-described rod 72, in the lower end recess 71c of the support tube 71, a fall prevention member 75 may be fixed to a lower end of the rod 72 via a spacer 74. This fall prevention member 75 may be configured with a bolt, and the fall prevention member 75 may be screwed in the lower end of the rod 72.

In addition, between the spring retainer 73 at the upper end of the rod 72 and a recessed bottom portion in the upper end recess 71b of the support tube 71, a second coil spring 76 may be stretched as urging means which urges the rod 72 upward.

A spacer 77 may be provided to a lower surface of the opposed portion 42 of the lower-left operation unit 22LE which may be opposed to the above-described rod 72, and a clearance g may be formed between a lower surface of the spacer 77 and an upper surface of the spring retainer 73 when the lower-left operation unit 22LE is not pushed down.

The spring force of the above-described second coil spring 76 may be set large compared to the spring force of the above-described first coil spring 65 (see FIG. 5).

An up-down interval of the clearance g, which is illustrated in FIG. 6, corresponds to the first operation region α in FIG. 7. When the lower-left operation unit 22LE illustrated in FIG. 6 is pushed down, the lower surface of the spacer 77 is caused to abut the upper surface of the spring retainer 73, the clearance g is made zero, and the lower-left operation unit 22LE is thereafter further pushed down against the spring force of the second coil spring 76, the characteristic of the second operation region β illustrated in FIG. 7 can be obtained.

As illustrated in the embodiments of FIG. 3, FIG. 5, and FIG. 6, upper sides of the above-described opposed portions 41 and 42 and axis-direction coupling sides 25 may be covered by covers 80, the characteristics of the first operation region α and the second operation region β in FIG. 7 can be obtained also by directly pushing down those covers 80, and upper surfaces of the covers 80 are formed to be flat for the purpose of intending an improvement in operability.

Note that in FIG. 1 and FIG. 2, for convenience of illustration, the above-described covers 80 are not illustrated.

As described above, the driving assistance device 20 of the embodiment illustrated in FIG. 1 to FIG. 7 is the driving assistance device 20 including the manually operable accelerator operation unit 21 in the vicinity of the steering wheel 2 provided in front of the driver seat 1 in the vehicle cabin. The accelerator operation unit 21 is operable in a state where the steering wheel 2 is gripped and the operation reaction force of the accelerator operation unit 21 exhibits the inflection point POI at which the operation reaction force rapidly becomes large in response to an increase in the operation amount (see the stroke amount in FIG. 7) of the accelerator operation unit 21 (see FIG. 1, FIG. 2, and FIG. 7).

In this configuration, because the inflection point POI is present, even when the operation force on the accelerator operation unit 21 slightly increases, the operation amount does not change very much as long as the operation amount of the accelerator operation unit 21 does not exceed the inflection point POI. Thus, the accelerator operation can easily be performed through manual operation.

Further, in some embodiments of the present disclosure, at the inflection point POI of the operation reaction force, the target requested acceleration (see the characteristic c in FIG. 7) of the vehicle by the accelerator operation is set to approximately zero (see FIG. 7).

In this configuration, because at the inflection point POI of the operation reaction force, the target requested acceleration of the vehicle by the accelerator operation is set to approximately zero (in other words, approximately zero G), acceleration and deceleration do not occur in a state where the accelerator operation is retained. Thus, the steering operation can safely be performed.

In addition, in some embodiments of the present disclosure, the accelerator operation unit 21 includes the first operation reaction force generation unit 51 which generates the operation reaction force in the region where the operation amount is smaller than the operation amount (stroke amount) at the inflection point POI of the operation reaction force (first operation region α), and the second operation reaction force generation unit 52 which generates the operation reaction force in the region where the operation amount is larger than the operation amount (predetermined stroke amount st1) at the inflection point POI of the operation reaction force (second operation region β).

In this configuration, the first operation reaction force generation unit 51 and the second operation reaction force generation unit 52 are provided, and different operation reaction forces can thereby be set for the region where the operation amount is smaller than the operation amount (predetermined stroke amount st1) at the inflection point POI (first operation region α) and for the region where the operation amount is larger than the operation amount (predetermined stroke amount st1) (second operation region β).

Moreover, in some embodiments of the present disclosure, the accelerator operation unit 21 is provided in an arc shape along the inner periphery side of the steering wheel 2, at least four or more support portions 31 and 32 which are capable of a slide operation with respect to the steering wheel 2 are arranged in left-right symmetry, and at least one support portion 32 among the support portions 31 and 32 is configured to serve as the second operation reaction force generation unit 52 (see FIG. 2 and FIG. 6).

In this configuration, because at least four or more support portions 31 and 32 capable of a slide operation with respect to the steering wheel 2 are arranged in left-right symmetry, an operational feeling of the accelerator operation unit 21 with respect to the steering wheel 2 can be made uniform.

In embodiments of the disclosure, the operation amount of the accelerator operation unit 21 may correspond to the stroke amount of the accelerator operation unit 21. Also, the operation amount at the inflection point may correspond to the predetermined stroke amount st1, the region where the operation amount is smaller than the operation amount at the inflection point may correspond to the first operation region α, the region where the operation amount is larger than the operation amount at the inflection point may correspond to the second operation region β, the support portions may correspond to the first support portions 31 and the second support portion 32, and the support portion to serve as the second operation reaction force generation unit may correspond to the second support portion 32.

The present disclosure is not limited only to the configurations of the above-described embodiments but can be used in many embodiments and variations, as would be understood by a person of ordinary skill in the art reading this disclosure.

For example, in the above embodiments, the second support portion 32 positioned in the lower-left part is used as the second operation reaction force generation unit 52, but the position of the second support portion 32 may be any of upper-left, upper-right, and lower-right positions in FIG. 2.

Further, in the above embodiments, a total of four support portions 31 and 32 are provided, but a structure may be employed in which a total of six (or more) support portions 31 and 32 are arranged in left-right symmetry. Similarly, fewer support structures may be used.

In addition, in the above embodiments, a configuration is exemplified in which the accelerator operation is performed in a total of two phases which are a first phase of the zero stroke amount st0 to the predetermined stroke amount st1 and a second phase of the predetermined stroke amount st1 to the maximum stroke amount stmax; however, a structure is possible in which the accelerator operation is performed in three or more phases. Similarly, only one phase could be used.

As described in the foregoing, the present disclosure is useful for a driving assistance device including a manually operable accelerator operation unit in the vicinity of a steering wheel provided in front of a driver seat in a vehicle cabin.

REFERENCE SIGNS LIST AND NUMERALS 1 driver seat
2 steering wheel
20 driving assistance device
21 accelerator operation unit
31 first support portion (support portion)
32 second support portion (support portion)
51 first operation reaction force generation unit
52 second operation reaction force generation unit
α first operation region (region where operation amount is smaller than operation amount at inflection point)
β second operation region (region where operation amount is larger than operation amount at inflection point)
POI inflection point
st1 predetermined stroke amount (operation amount at inflection point)

The invention claimed is:

1. A driving assistance device comprising:
a lever coupled to a steering wheel of a vehicle and configured for manual operation by a driver of the vehicle,
wherein acceleration of the vehicle is controlled by pressing the lever,
wherein the lever is configured to be pressed while the driver grips the steering wheel,
wherein an operation reaction force opposes pressing of the lever, and
wherein the operation reaction force increases when the lever is pressed beyond a certain point, and
wherein the lever is provided in an arc shape along an inner periphery side of the steering wheel, the lever comprises at least four support portions which are capable of a slide operation with respect to the steering wheel are arranged in left-right symmetry, and at least one support portion among the at least four support portions is configured to generate an operation reaction force in a region where a first operation amount of the lever is larger than a second operation amount of the lever at an inflection point of the operation reaction force.

2. The driving assistance device of claim 1, wherein the lever is configured to slide along a sliding portion in an axial direction of the steering wheel.

3. A driving assistance device comprising:
a manually operable accelerator operation unit and a steering wheel provided in front of a driver seat in a vehicle cabin of a vehicle,
wherein the accelerator operation unit is operable in a state where the steering wheel is gripped,
wherein an operation reaction force of the accelerator operation unit exhibits an inflection point at which the operation reaction force increases in response to an increase in an operation amount of the accelerator operation unit,
wherein, at the inflection point of the operation reaction force, a target acceleration of the vehicle requested by an accelerator operation is set to approximately zero,
wherein the accelerator operation unit comprises a first operation reaction force generation unit which generates a first operation reaction force in a region where the operation amount is smaller than an operation amount at the inflection point of the operation reaction force, and the accelerator operation unit comprises a second operation reaction force generation unit which generates a second operation reaction force in a region where the operation amount is larger than the operation amount at the inflection point of the operation reaction force, and
wherein the accelerator operation unit is provided in an arc shape along an inner periphery side of the steering wheel, at least four support portions which are capable of a slide operation with respect to the steering wheel are arranged in left-right symmetry, and at least one support portion among the at least four support portions is configured to serve as the second operation reaction force generation unit.

4. The driving assistance device according to claim 3, wherein the manually operable accelerator operation unit comprises:

a plurality of operation units, each of the plurality of operation units configured to be pushed downward by a driver's hand in a direction of an axis of the steering wheel;

a slide portion supported by a support portion among the at least four support portions;

a connecting portion that couples the plurality of operation units together such that the plurality of operation units slide together along the slide portion when pressed.

5. The driving assistance device according to claim 4, wherein the slide portion comprises a first slide portion and a second slide portion, and the first slide portion is positioned on an opposite side of the steering wheel as the second slide portion.

* * * * *